(12) United States Patent
Rollins (10) Patent No.: US 8,320,282 B2
(45) Date of Patent: Nov. 27, 2012

(54) AUTOMATIC CONTROL NODE SELECTION IN RING NETWORKS

(75) Inventor: Michael Timothy Rollins, Santa Rosa, CA (US)

(73) Assignee: Calix, Inc., Petaluma, CA (US)

( * ) Notice: Subject to any disclaimer, the term of this patent is extended or adjusted under 35 U.S.C. 154(b) by 713 days.

(21) Appl. No.: 12/512,223

(22) Filed: Jul. 30, 2009

(65) Prior Publication Data
US 2011/0026439 A1 Feb. 3, 2011

(51) Int. Cl.
*H04L 12/28* (2006.01)
(52) U.S. Cl. .......................... 370/258; 370/404
(58) Field of Classification Search .................. None
See application file for complete search history.

(56) References Cited

U.S. PATENT DOCUMENTS

| 5,461,608 | A | 10/1995 | Yoshiyama | |
|---|---|---|---|---|
| 5,920,267 | A | 7/1999 | Tattersall et al. | |
| 6,128,282 | A * | 10/2000 | Liebetreu et al. | 370/235 |
| 6,633,538 | B1 | 10/2003 | Tanaka et al. | |
| 7,352,765 | B2 * | 4/2008 | Dai et al. | 370/424 |
| 7,376,138 | B1 * | 5/2008 | Cotter | 370/403 |
| 2001/0048687 | A1 * | 12/2001 | Coden | 370/403 |
| 2005/0207348 | A1 * | 9/2005 | Tsurumi et al. | 370/241 |
| 2008/0118244 | A1 * | 5/2008 | Nakada | 398/59 |
| 2011/0022665 | A1 * | 1/2011 | Pinto et al. | 709/206 |

OTHER PUBLICATIONS

Bränl et al., "A Self-Configuring Network for Mobile Agents," Industrial Robot International Journal, vol. 28, No. 3, 2001, 7 pages.
ITU-T Draft Recommendation G.8032/Y.1344, Ethernet Ring Protection Switching, Jun. 2008, 44 pages.
S. Shah and M. Yip, RFC 3619, Extreme Networks' Ethernet Automatic Protecting Switching (EAPS), Version 1, Network Working Group, Internet Engineering Task Force (IETF), Oct. 2003, 7 pages.

* cited by examiner

*Primary Examiner* — Phirin Sam
(74) *Attorney, Agent, or Firm* — Shumaker & Sieffert, P.A.

(57) ABSTRACT

In general, this disclosure describes techniques that may allow detection of a missing control node on a ring network and selection of a single node on ring network to act as the control node. In one example, a method includes receiving, at a first node in a ring network, a data unit transmitted by a second node in the ring network, the data unit including an identifier that identifies the second node. The method further includes comparing the identifier of the second node to an identifier that identifies the first node, and automatically selecting one of the first node and the second node as a control node for the ring network based on the comparison.

48 Claims, 5 Drawing Sheets

AUTOMATIC CONTROL NODE SELECTION IN RING NETWORKS

TECHNICAL FIELD

The disclosure relates to computer networks and, more particularly, to computer networks connected in a ring topology.

BACKGROUND

A computer network is a collection of interconnected computing devices that can exchange data and share resources. Often, in highly populated areas, the computer network is configured in a ring formation, where certain devices, such as layer 2 devices, e.g., a switch, are interconnected via network links in a ring. That is, each layer 2 device couples via a separate network link to two adjacent layer 2 devices, one clockwise and the other counterclockwise around the ring. When arranged in a ring, a network, e.g., an optical fiber network, a copper network, or a combination of both, is referred to as a "ring network."

Generally, access nodes, subtending from a layer 2 device, provide access to the ring network. Access nodes, such as a Digital Line Subscriber Line Access Multiplexer (DSLAM), a Cable Modem Termination System (CMTS), and a Gigabit Passive Optical Network (GPON), for example, each manage access by one or more of the computing devices to the ring network. The access node may, for example, multiplex (or "aggregate") traffic from computing devices into a composite signal and transmit this signal to a switch on the ring network for delivery to one or more destinations.

The computing devices couple to the access nodes to gain access to the ring network and thereby interconnect with other computing devices coupled to the ring network via access nodes. The computing devices generate data traffic and exchange this data traffic with other computing devices via the interconnection provided by the ring network. The ring network may provide generous geographical coverage due to its topology, which allows the ring network to reach computing devices dispersed over wide geographical areas. The ring network may be resilient in that it can forward data in both the clockwise and counterclockwise directions to avoid a faulted link.

SUMMARY

In general, this disclosure describes techniques that may allow detection of a missing control node on a ring network and selection of a single node on the ring network to act as the control node. In a ring topology, e.g., an Ethernet ring topology, there is one control node and one or more non-control nodes connected one to another to form a ring. A control node also may be referred to as a master node. During normal operation, the control node is responsible for placing a block in the data path of the ring in order to prevent a traffic loop. The control node is also responsible for communicating with non-control nodes, via messaging protocols, on the ring network in order to manage and control ring topology changes. A network operator may designate a node as the control node during creation and deployment of the ring network. Failure by the network operator to designate a control node on the ring network may result in a permanent traffic loop, e.g., in the layer 2 Ethernet network.

Using the techniques described in this disclosure, a node may be automatically selected to act as a control node if no control node was previously designated on the ring network, e.g., by misconfiguration by the network operator. These techniques may provide a mechanism whereby the network operator does not need to designate a control node. Instead, during initial ring turn up, all the nodes comprising the ring, e.g., an Ethernet ring, communicate with each other and using a predetermined election algorithm shared by all nodes, one of the nodes elects itself as the control node.

In one example, the disclosure is directed to a method comprising receiving, at a first node in a ring network, a data unit transmitted by a second node in the ring network, the data unit including an identifier that identifies the second node. The method further comprises comparing the identifier of the second node to an identifier that identifies the first node, and automatically selecting one of the first node and the second node as a control node for the ring network based on the comparison.

In another example, the disclosure is direct to a network device comprising a processor configured to receive, at a first node in a ring network, a data unit transmitted by a second node in the ring network, the data unit including an identifier that identifies the second node, compare the identifier of the second node to an identifier that identifies the first node, and automatically select one of the first node and the second node as a control node for the ring network based on the comparison.

In another example, the disclosure is directed to a computer-readable medium comprising instructions encoded on the computer-readable medium that, upon execution, cause a processor within a network device to receive, at a first node in a ring network, a data unit transmitted by a second node in the ring network, the data unit including an identifier that identifies the second node, compare the identifier of the second node to an identifier that identifies the first node, and automatically select one of the first node and the second node as a control node for the ring network based on the comparison.

In another example, the disclosure is directed to a network device comprising means for receiving, at a first node in a ring network, a data unit transmitted by a second node in the ring network, the data unit including an identifier that identifies the second node, means for comparing the identifier of the second node to an identifier that identifies the first node, and means for automatically selecting one of the first node and the second node as a control node for the ring network based on the comparison.

In another example, the disclosure is directed to a system comprising a ring network comprising a first node and a second node. The first node of the ring network comprises an interface module comprising at least one port that receives a data unit transmitted by the second node, the data unit including an identifier that identifies the second node, and a first control unit. The first control unit is configured to compare the identifier of the second node to an identifier that identifies the first node, and automatically select one of the first node and the second node as a control node for the ring network based on the comparison.

The details of one or more aspects of the disclosure are set forth in the accompanying drawings and the description below. Other features, objects, and advantages will be apparent from the description and drawings, and from the claims.

DETAILED DESCRIPTION

Ring topologies, e.g., Ethernet ring topologies, are commonly used in networks as they require less optical fiber or copper for connectivity and provide an effective topology for creating a loop-free, layer 2 network with good convergence times. Ring topologies include a number of network devices, or transport nodes, connected such that each transport node is connected to two other transport nodes, thereby forming a ring configuration. Ring topologies require a transport node to be configured as a control node to block traffic in order to prevent a traffic loop around the ring network.

For certain types of data that do not include a specific destination, such as multicast or broadcast data, for example, each of the transport nodes in the ring network may simply forward this data around the ring to ensure each node forwards the ring to every transport node. If none of the transport nodes detects that this data is looping the ring network, each switch may continue to forward the traffic endlessly, thereby establishing a traffic loop, which may substantially impact the performance of the ring network by needlessly consuming network resources, such as switch processing time and memory as well as link bandwidth.

One of the transport nodes may be configured to function as a control node that blocks traffic to prevent traffic loops, as mentioned above. However, configuring a control node is ordinarily a manual process that is prone to error by a network operator. For example, a network operator may misconfigure the ring network by failing to designate one of the nodes in the ring as a control node. In general, this disclosure describes techniques that may allow automatic detection of a missing control node on a ring network and automatic selection of a single node on the ring network to act as the control node.

Figure 1:
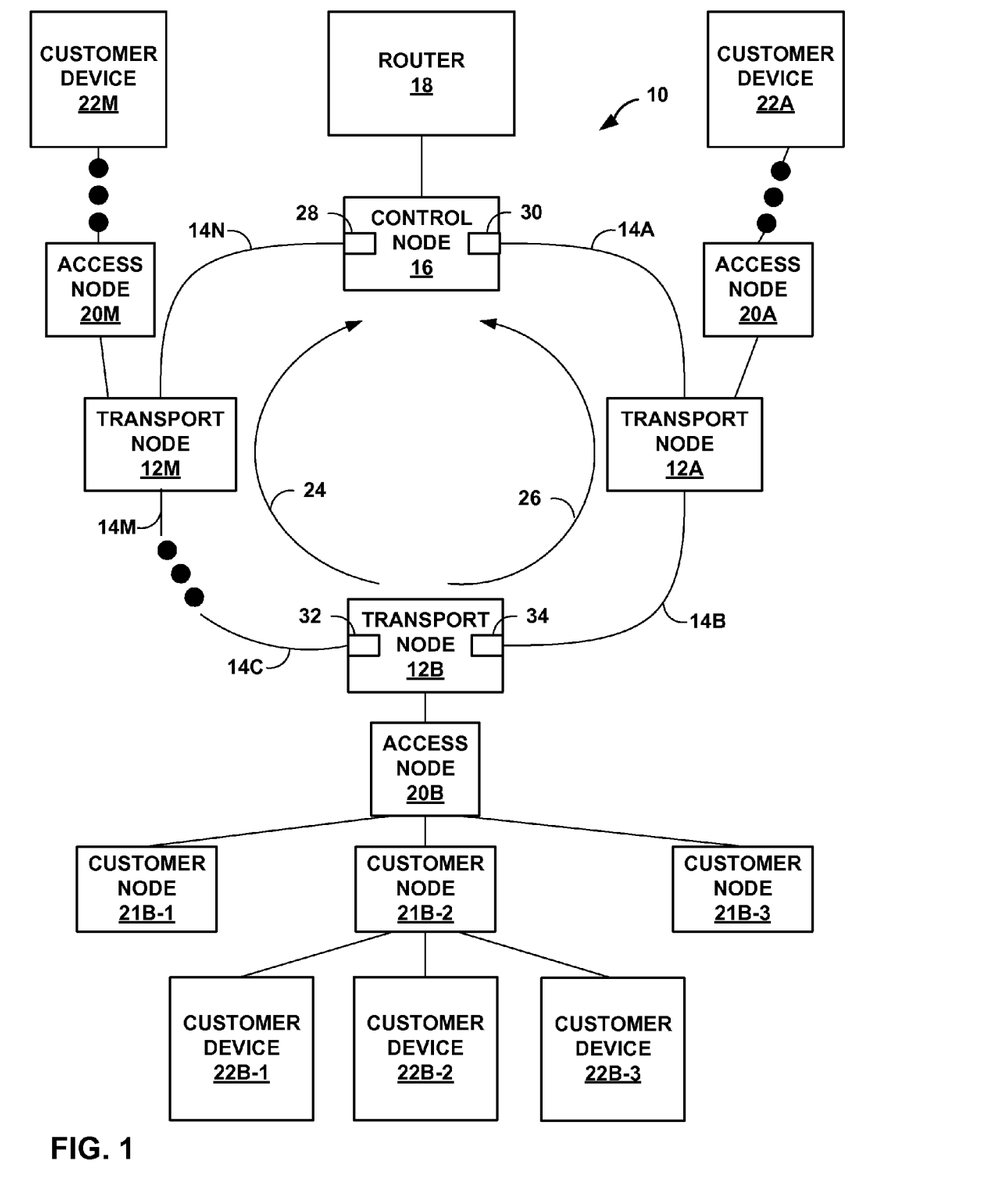
FIG. 1 is a block diagram illustrating an example ring network configured to automatically select a control node in a ring network using the techniques described in this disclosure.

FIG. 1 is a block diagram illustrating an example ring network configured to automatically assign a virtual local area network to a domain in a ring network using the techniques described in this disclosure. As shown in FIG. 1, ring network 10 includes transport nodes 12A-12M ("transport nodes 12"), links 14A-14N ("links 14"), a control node 16, router 18, access nodes 20A-20M ("access nodes 20"), customer nodes 21A-21M ("customer nodes 21"), and customer devices 22A-22M ("customer devices 22"). Transport nodes 12 and control node 16 are coupled via respective links 14 to form a ring topology. For example, control node 16 is coupled to transport node 12A via link 14A, transport node 12A is coupled to transport node 12B via link 14B, and so on, completing the ring with transport node 12M coupled to control node 16 via link 14N. Each transport node 12 may be coupled to an access node 20. Each access node 20 may be coupled to one or more customer nodes 21, which in turn may be coupled to one or more customer devices 22. Access nodes, e.g., Digital Line Subscriber Line Access Multiplexer (DSLAM), a Cable Modem Termination System (CMTS), a Gigabit Passive Optical Network (GPON) Optical Line Terminal (OLT), or other broadband service transport and/or aggregation elements, each manage access by one or more of the customer devices to the ring network. Router 18, a layer 3 device, provides access to a layer 3 network (not shown), e.g., the Internet. Additional examples of transport and/or aggregation elements include the Calix C7 Multiservice Access Platform and the Calix E5 Multiservice Ethernet Service Platform, commercially available from Calix Networks, Inc., of Petaluma, Calif.

Customer nodes 21 may comprise one of many devices used to connect a customer device, e.g., customer device 22, to a network, e.g., ring network 10 and the Internet. Customer node 21 may include, but is not limited to, a cable modem, a digital subscriber line (DSL) modem, and/or an optical network terminal (ONT). Numerous customer nodes 21 may subtend from an access node. For example, in FIG. 1, three customer nodes, namely customer nodes 21B-1, 21B-2, and 21B-3 are shown subtending from access node 20B. While three customer nodes are depicted subtending from access node 20B, there may be more, or fewer, customer nodes 21B in a given implementation.

Subtending from each customer node 21 is one or more customer devices 22. Customer devices 22 may comprise a wide variety of computing devices, such as one or more of a personal digital assistant (PDA), a workstation, a personal computer, a laptop computer, a television set-top box, a voice-over-internet protocol (VoIP) telephone, or any other computing device capable of generating and/or receiving traffic via ring network 10 and access node 20. That is, customer devices 22 may comprise any computing device capable of implementing network protocols, such as a transmission control protocol (TCP)/internet protocol (IP), to receive and forward traffic to and from access nodes 20. It should be noted that each access node may be coupled to multiple customer devices 22. In addition, a single transport node 12 may be coupled to multiple access nodes 20 (not shown).

As seen in FIG. 1, numerous customer devices 22 may subtend from a single customer node 21. For example, in FIG. 1, three customer devices, namely customer devices 22B-1, 22B-2, and 22B-3, are shown subtending from customer node 21B-2. While three customer devices are depicted subtending from customer node 21B-2, there may be more, or fewer, customer devices 22 in a given implementation. Customer devices 22, as described above, may include various client computing devices configured to support a variety of services such as voice, video and data services.

Exemplary ring network 10 may be configured to provide a wide area network (WAN) or a metropolitan area network (MAN). Ring network 10, because it services two or more customer devices 22, may be referred to as a "backbone" network, in that ring network 10 provides a backbone to support the exchange of traffic between customer devices 22. Typically, to support the high level of data traffic often found on backbone networks, links 14 may comprise optical fiber links to facilitate the rapid transfer of the traffic around ring network 10.

Transport nodes 12, e.g., a layer 2 device such as a layer 2 switch, receive and forward traffic from customer devices 22, via access nodes 20, over ring network 10. Although each access node 20 is shown subtending from a transport node 12, this is a logical division and the access node may reside in the transport node. Each of transport nodes 12 also forward traffic received from other transport nodes 12 and control node 16 via ring network 10 to respective customer devices 22.

The ring topology of ring network 10 may offer generous geographic coverage and resilience. That is, ring network 10 may reach customer devices 22 dispersed over wide geographic areas. Ring network 10 provides resilience because traffic may be forwarded in both a clockwise direction 24 and counterclockwise direction 26 around ring network 10. By enabling both directions of forwarding, transport nodes 12 may forward traffic so as to avoid one of links 14 that has failed, while still reaching every one of the transport nodes 12 and control node 16.

Upon detecting a fault in link 14A, for example, control node 16 may forward traffic via link 14N counterclockwise around ring network 10 to reach transport node 12A. Transport node 12A may, to avoid faulted link 14A, simultaneously forward traffic via link 14B clockwise around ring network 10 to reach control node 16. Ring network 10 therefore may support simultaneous forwarding of traffic in both the clockwise and counterclockwise directions to avoid the faulted link. Consequently, ring network 10 may not only provide wide geographical coverage but resilience as well. Layer 2 access networks are commonly built using ring topologies to conserve fiber and provide an effective topology for network resilience and convergence after a failure.

While providing wide geographical coverage and reasonable resilience, the ring network may suffer from traffic loops. For certain types of data that do not include a specific destination, such as multicast or broadcast data, for example, each of the transport nodes 12 may simply forward this data around the ring to ensure each transport node 12 forwards the data to every computing device. If none of transport nodes 12 identify that this data is looping the ring network, each transport node 12 may continue to forward the traffic endlessly, thereby establishing a traffic loop. As mentioned above, a traffic loop may substantially impact the performance of the ring network by needlessly consuming network resources, such as switch processing time and memory as well as link bandwidth.

In order to correct for traffic loops, a master device, e.g., control node 16, may be configured using one of many ring topology protocols, e.g., IEEE 802.17 Resilient Packet Ring Protocol, Rapid Ring Protection Protocol, Resilient Ethernet Protocol, and RFC-3619, to block traffic in one direction via one of its ports. Control node 16 may include primary port 28 and secondary port 30. In one implementation, control node 16 forwards traffic via primary port 28 and blocks traffic via secondary port 30. Traffic that is blocked at secondary port 30 may be discarded so that it is not forwarded through the loop again. Typically, control node 16 blocks secondary port 30 logically. In other words, control node 16 may actively filter traffic arriving via secondary port 30, discarding or dropping certain traffic, such as data traffic, but allowing other traffic, such as control traffic used by control node 16 to monitor or otherwise control ring network 10. By blocking traffic arriving via secondary port 30 in this manner, control node 16 ensures that data traffic does not continually loop through the ring network, while preserving the beneficial aspects of wide geographical coverage and resilience associated with the ring network.

As mentioned above, the network operator must manually designate a node on ring network 10 as the control node during creation and deployment of the ring network. Failure of the equipment operator to designate a control node on the ring network may result in a permanent traffic loop being established. In accordance with this disclosure, techniques are disclosed such that the network operator may not need to designate a control node. Instead, during initial ring turn up, all of the transport nodes comprising the ring network may communicate with each other and elect one of the transport nodes on the ring to act as the control node, i.e., master node, for the ring. Ring turn up may include, for example, physically deploying the equipment, physically interconnecting the ring ports, powering up the equipment, configuring the individual nodes, e.g., designating a pair of ring ports as being ring connected and a control VLAN, and enabling the ring ports on the individual nodes. By providing an autonomous method of detecting a missing control node and then selecting a single node on the ring to act as the control node, the probability of a traffic loop existing is minimized.

In accordance with the disclosure and as will be described in more detail below, autonomously detecting a missing or otherwise misconfigured control node and selecting a single node on the ring to act as the control node may include a determination or detection that no control node is present on the ring, and the selection of a node on the ring to act as the control node.

Regarding the detection that no control node is present on the ring, in some examples, each transport node on the ring network periodically transmits a "HELLO" message in the form of a data unit via each of the ring ports to which it is connected. The "HELLO" message may contain an identifier for the transport node that is at least unique with respect to the identifiers of the other transport nodes within the ring network. Example identifiers include, but are not limited to, the transport node's media access control (MAC) address, a character string, or a number. Again, each identifier should be unique to the ring and each identifier should be able to be compared to other identifiers on the ring.

During normal operation of the ring, i.e., where a control node is designated on the ring by the operator, or has been selected according to the techniques of this disclosure, all ring management messages, including the "HELLO" messages described above, are received by the control node and are terminated at the control node. "HELLO" messages ordinarily are not forwarded by the control node when the control mode is functioning properly.

Referring to FIG. 1, during steady state operation, transport node 12B transmits "HELLO" messages onto each of ports 32 and 34. The "HELLO" messages are received and forwarded by other transport nodes on ring, e.g., transport nodes 12A, 12M, and received and terminated by control node 16. This is normal steady state operation in a stable, properly operating ring network 10, e.g., a Layer 2 Ethernet ring topology.

Referring still to FIG. 1, assume that control node 16 has either not been designated by the operator or has not been selected autonomously according to the techniques of this disclosure. That is, control node 16 is functionally equivalent to any of the transport nodes 12 on the ring network. In this case, "HELLO" messages transmitted out of port 32 of transport node 12B will traverse the ring and arrive back on port 34 of transport node 12B. Similarly, "HELLO" messages transmitted out of port 34 of transport node 12B will traverse the ring and arrive back on port 32 of transport node 12B. In such a configuration, transport node 12B will receive its own "HELLO" messages. It should be noted that all transport nodes 12 in FIG. 1 include multiple ports. However, for simplicity, only transport node 12B and control node 16 have been explicitly depicted with ports.

As mentioned above, a control node normally actively filters traffic by discarding or dropping packets to prevent traffic loops. Thus, a transport node receiving its own "HELLO" message(s) indicates that a control node is not present on ring network 10, or that a control node is not functioning properly as a control node. Once it is discovered that no operable control node is present on ring network 10, transport nodes 12 on ring network 10 determine which transport node should be selected as the control node for the ring.

Reception by a transport node of its own "HELLO" message indicates that a control node is not present on the ring network, or is not functioning properly, because a control node should block, drop, discard or otherwise prevented "HELLO" messages from being forwarded back to the transport node that originated the "HELLO" message.

It should be noted that although the previous description for determining that there is no control node configured on the ring is described with respect to transport node 12B, the same procedure may simultaneously be used by all transport nodes on the ring. That is, every transport node on the ring may be transmitting "HELLO" messages to every other transport node on the ring.

Regarding the selection of the node on the ring that will act as the control node, upon receiving a "HELLO" message that is not its own "HELLO" message, the receiving transport node may create an entry in a table in memory, e.g., in an internal database, containing the unique identifier of the node that transmitted the "HELLO" message. By building up a table that includes the unique identifiers of all the transport nodes on the ring, each transport node creates a complete view of the transport nodes on the ring. During normal operation, it is acceptable for a transport node to receive "HELLO" messages from other nodes because the transport node receiving the "HELLO" message is located between the transmitting transport node and the control node. Hence, the control node is not able to terminate the "HELLO" message yet.

Tracking the unique identifiers carried by the "HELLO" message of the transport nodes on the network facilitates the determination of which transport node on the ring should be selected as the ring's control node in the event that no control node was configured on the ring. When transport nodes 12 discover that no control node is configured on the ring via the method described above, each transport node queries its table of unique identifiers. Using a common selection mechanism, e.g., lowest MAC address value, highest numerical value, or greatest lexical string identifier, one transport node selects itself as the control node. Regardless of what selection criterion is used, it should be used by all transport nodes on the ring so that one node selects itself as the control node while the remaining transport nodes on the ring do not. Upon selecting itself as the control node, the newly selected control node takes control of the overall ring management protocol and blocks, drops, discards or otherwise prevents "HELLO" messages from being forwarded around the ring from the transport nodes. In addition, the newly selected control node sets the blocking port for the ring, thus defeating any ring loop for data plane traffic.

Figure 2:
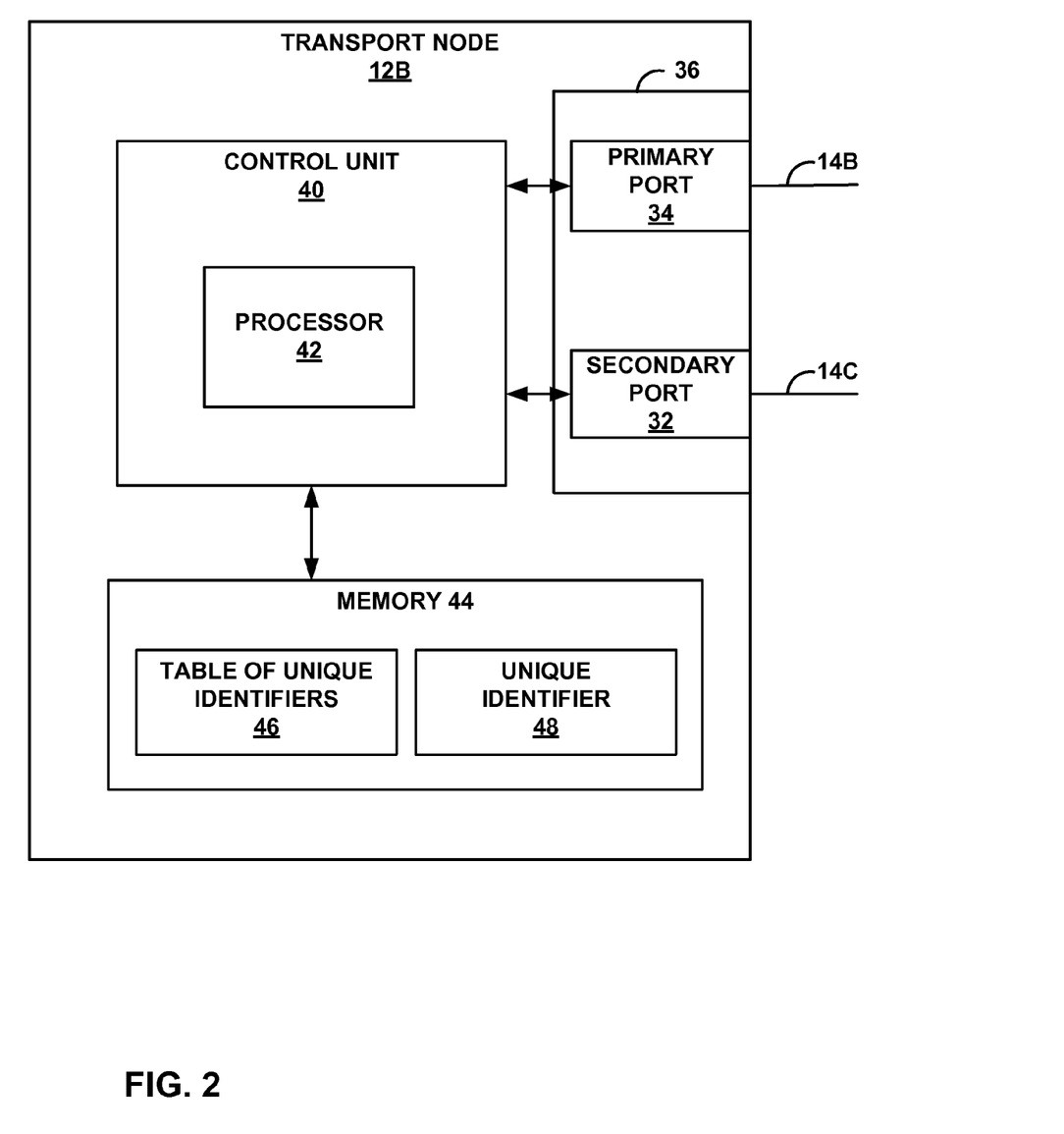
FIG. 2 is a block diagram illustrating an example of a transport node that may implement the techniques described in this disclosure.

FIG. 2 is a block diagram illustrating, in more detail, an example of transport node 12B shown in FIG. 1 that implements the techniques described in this disclosure. Although FIG. 2 illustrates transport node 12B, each of transport nodes 12 are similarly configured. As shown in FIG. 2, transport node 12B includes interface module 36. Interface module 36 represents a module for interfacing with each of links 14B, 14C. Interface module 36 includes primary port 34 and secondary port 32, where primary port 34 interfaces with link 14B and secondary port 32 interfaces with link 14C. Primary port 34 and secondary port 32 are illustrated in this manner merely for exemplary purposes and represent logical designations. That is, currently designated secondary port 32 may be re-designated as a primary port and primary port 34 may also be re-designated as a secondary port. Interface module 36 may represent hardware, software, or a combination of both to implement the techniques described in this disclosure.

Although not shown for ease of illustration purposes, interface module 36 may comprise additional ports for receiving additional links. For example, one or more of these additional ports may interface with the additional links to couple transport node 12B to access node 20B.

Transport node 12B also includes a control unit 16 that couples to interface module 36 and, in particular, primary port 34 and secondary port 32. Control unit 40 may comprise one or more processors 42 that execute software instructions, such as those used to define a software or computer program, stored in a computer-readable storage medium such as memory 44 (e.g., a Flash memory, random access memory (RAM), or any other type of volatile or non-volatile memory that stores instructions), or a storage device (e.g., a disk drive, or an optical drive). Alternatively, control unit 40 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

In accordance with the techniques of this disclosure, transport node 12B may further store in memory 44 the unique identifiers of all the transport nodes on ring network 10, e.g., in table of unique identifiers 46. That is, table 46 may include a unique identifier for each transport node on the ring. In some examples, table 46 may include the MAC address of each transport node 12 on the ring. The MAC address may be programmed at the time of manufacture. In other examples, table 46 may include a character string for each transport node 12 on the ring. In another example, table 46 may include numerical values for each transport node 12 on the ring. In some examples, a character string or numerical value may be assigned to transport node 12 by an administrator. In other examples, the character string or numerical value may be programmed at the time of manufacture.

As mentioned above, each transport node on the ring network periodically transmits a "HELLO" message, in the form of a message data unit, via each of the ring ports to which it is connected. The "HELLO" message contains the unique identifier for the transport node. In some examples, the "HELLO" message may be separate from the ring control. That is, the "HELLO" message may not be part of any ring protocol used by ring network 10. In other examples, the "HELLO" message may be bundled together with other information advertised between ring nodes, e.g., link layer discovery protocol (LLDP) advertisement data units. The "HELLO" messages may allow each transport node to create a complete view of the transport nodes on the ring, thereby facilitating the automatic selection of one of the transport nodes if a control node was not designated or not functioning.

Control unit 40 and, in particular, processor 42 of transport node 12B, constructs a "HELLO" data unit that includes the unique identifier for that transport, e.g., the MAC address of transport node 12B. In some examples, the data unit may further include a cyclical redundancy check (CRC) code. As will be described in more detail below, the data unit may further include a biasing factor that may bias selection of a control node. Processor 42 may add additional information to the data unit by encapsulating the data unit with headers and trailers, and then transmitting the data unit via both port 32 and port 34 such that the data units traverse the ring in both clockwise direction 24 and counterclockwise direction 26.

In some examples, it may be desirable to transmit the "HELLO" messages over a control channel (not shown) of ring network 10, rather than the data channel. Transmitting the "HELLO" messages over the control channel places the data units within a control VLAN (not shown), which is separate from any data plane traffic, thereby providing an additional level of security against malicious users. For example, if "HELLO" messages were sent over the data channel, it may be possible for an end user to inject a malicious "HELLO" packet onto the data plane that mimicked a node on the network that is not actually present on the backbone. If the malicious "HELLO" message was crafted so that it came from the node that would be selected as the control node, it is possible that the ring would not be broken, resulting in a traffic loop.

Upon receiving a "HELLO" message data unit transmitted by another transport node 12 on the ring, transport node 12B, and in particular processor 42 of control unit 40, may calculate a CRC code of the data unit and compare it to the CRC code in the data unit. If the two CRC codes match, the headers and trailers are removed from the data unit and the unique identifier of the transport node that transmitted the "HELLO" message is stored in memory 44. In another example, the unique identifier may be extracted from the data unit rather than removing headers and trailers. In some examples, each unique identifier received is stored in table 46. With each received "HELLO" message, each transport node 12 on ring network 10 builds a table of the unique identifiers of all the other transport nodes that exist on ring network 10. In implementations that include a biasing factor within the data unit, the biasing factor may also be stored in memory 44 in table of unique identifiers 46.

Referring again to FIG. 1, assume that an operator failed to configure control node 16 as a control node, and instead it was functionally equivalent to a transport node. Also assume that, with control node 16 acting only as a transport node, there are only four transport nodes on ring network 10. Each of the four transport nodes transmits "HELLO" messages and each creates a list in memory 44, e.g., table 46, of the unique identifiers of the three other transport nodes on ring network 10. For example, transport node 12B may have three entries stored in table 46, one for each of the three other transport nodes, e.g., 12A, 12M, and 16.

As indicated above, during normal operation, i.e., when ring network 10 includes a node acting as a control node, a transport node should never receive its own "HELLO" message. Instead, the control node should actively filter the "HELLO" messages so that "HELLO" messages are blocked, dropped, discarded or otherwise prevented from being forwarded back to the transport node that originated the "HELLO" message. Thus, when a transport node receives the "HELLO" message that it originated, ring network 10 is likely misconfigured and missing a control node.

In some examples, the autonomous selection of a transport node to act as a control node is invoked when one of transport nodes 12 receives its own "HELLO" message. As described above, upon receiving a "HELLO" message, each transport node removes information such as the header and trailer by decapsulating the data unit, and then stores the unique identifier received to memory 44. However, prior to storing the unique identifier to memory 44, each transport node 12 compares the received unique identifier against its own unique identifier stored as unique identifier 48 in memory 44. For example, if MAC addresses are being used as unique identifiers, then unique identifier 48 may be the MAC address that was programmed into non-volatile memory by the manufacturer of the transport node. As mentioned above, during normal operation, received unique identifiers will not match unique identifier 48 because a control node will have blocked the "HELLO" message from traversing the entire ring. When the ring network is misconfigured and missing a control node, however, one of the received unique identifiers will match the transport node's own unique identifier 48.

When the received unique identifier matches the transport node's own unique identifier 48, each transport node 12 and, in particular, each processor 42 of each transport node 12, queries table of unique identifiers 46 stored in memory 44. Each respective processor 42 may be configured to execute a common selection mechanism, e.g., lowest MAC address value, highest MAC address value, or highest numerical value, in order to select automatically, i.e., without manual intervention, one transport node on the ring to act as the control node. For example, a MAC address may be a 48-bit address that may be converted into an integer and compared with other MAC addresses.

By way of specific example, again assume that control node 16 has been misconfigured as a transport node. Upon receiving its own "HELLO" message, each transport node 12 invokes a control node selection routine such that each transport node 12 compares its unique identifier 48 to each of the entries stored in table of unique identifiers 46. Transport node 12B has stored in table of unique identifiers 46 the unique identifiers for each of transport nodes 12A, 12M, and 16. If, for example, the lowest MAC address is used as the common selection mechanism, transport node 12B compares its MAC address to each MAC address stored in table of unique identifiers 46. If the MAC address of transport node 12B is the lowest MAC address, highest MAC address, or other selection criteria, transport node 12B selects and configures itself automatically, without manual intervention, as the control node. If the MAC address of transport node 12B is not the lowest MAC address, for example, transport node 12B takes no action, maintains its functional status as a transport node, and waits for another transport node, e.g., 12A, 12M, or 16, on the ring to select and configure itself automatically, without manual intervention, to act as the control node. It should be noted that each transport node is performing this selection routine because each transport node has received its own "HELLO" message if there is no control node configured on ring network 10.

In some examples, transport node 12B may wait a predefined time before declaring itself to be the control node. That is, there may be a predefined "Hold Off" time configured on each transport node 12 that prevents the transport node from declaring itself the control node until after the "Hold Off" time has elapsed. In one example, the "Hold Off" time may be longer than the period at which the "HELLO" messages are transmitted by the transport nodes. For example, if "HELLO" messages are transmitted every 10 seconds, a "Hold Off" time may be set to be greater than 10 seconds, e.g., 15 seconds. Including a "Hold Off" time greater than the "HELLO" time may prevent a transport node from declaring itself as the control node prior to receiving all the unique identifiers of each transport node on the ring.

Upon selecting itself as the control node, the newly selected control node takes control of the overall ring management protocol and stops forwarding "HELLO" messages around the ring from the transport nodes. For example, if transport node 12B selects itself as the control node for the ring, transport node may begin performing a number of control node functions. Transport node 12B, as a control node, may begin to transmit advertisements to all the other nodes on the ring indicating that it is the control node. Transport node 12B, as a control node, may also block its ports to prevent traffic loops and relay control messages. If a link 14 on the ring breaks and a transport node reports the failure, transport node 12B may begin to take steps to reconfigure the ring to divert traffic around the failure. If a transport node reports that the break is gone, transport node 12B, as a control node, may begin to take steps to heal the ring, e.g., reconfiguring the ring back to its original configuration.

In some examples, a weighting mechanism, or biasing factor, may be included in the "HELLO" message. A biasing factor may be included in order to favor the selection of a specific node for selection as the control node. By adding a biasing factor to the selection process, the operator may bias control node selection toward the transport node(s) that may be more desirable from a network deployment standpoint. For example, when a ring network is comprised of a node in a central office (CO) with the rest of the ring nodes being present in remote locations, it may be desirable for the selection to be biased towards selecting the node present in the CO as the control node due to increased uplink switch capacity that may be present at the CO. Thus, when transport nodes 12 on ring network 10 are executing the selection routine, processor 42 of each transport node may apply any biasing factor that was previously transmitted and stored.

In one example, the biasing factor may be considered to be a multiplier. For example, if a MAC address is used as a unique identifier, the MAC address is sent via a "HELLO" message, along with the biasing factor, e.g., as metadata in the "HELLO" message. The biasing factor may be stored along with the MAC address in memory 44 in table of unique identifiers 46. During the selection process, processor 42 may convert the MAC address to an integer, multiply it by its associated biasing factor, and use this derived value as the number for determining which transport node should become the control node for the ring. In some examples, if the derived value is equal to one or more of the stored unique values to which a comparison is being made, the MAC address itself may be used to make the final determination of which transport node should become the control node.

By way of specific example, assume that MAC addresses are used as the unique values, that the highest MAC address will be selected to be the control node, and that a biasing factor is included with the MAC address in the "HELLO" message. Processor 42 retrieves from table of unique identifiers 46 each MAC address and its associated biasing factor. Processor 42 then multiplies each MAC address by its associated biasing factor, and compares the resultant values. If a transport node's MAC address multiplied by its biasing factor is greater than the other values, that particular transport node selects itself to be the control node. If one or more of the resultant values are equal, processor 42 compares the MAC addresses alone, i.e., without the biasing factors applied, in order to determine which transport node should become the control node. If, for example, all the nodes have a biasing factor of 1, then the MAC address is effectively the value to consider. If, for example, one node has a large biasing factor and the other nodes have a biasing factor of 1, the node with the large biasing factor will likely be selected as the control node. A node with a biasing factor greater than the biasing factor of another node may be considered to be weighted more heavily in terms of the selection process.

In some examples, the biasing factor may be learned by the node itself. For example, processor 42 of transport node 12 may determine from a stored hardware profile that it has numerous high traffic ports, e.g., ten 10-Gigabit ports, and use this hardware profile characteristic in creating a biasing factor. In another example, the aggregate bandwidth of the node may be used in creating a biasing factor. Other examples may use for example, a software version of the node, a hardware version of the node, a Global Positioning System (GPS) coordinate of the node, upstream network adjacency of the node, e.g., adjacency of the node to a higher order router that provides an uplink to the rest of the network, as well as a user defined weighting value in order to create a biasing factor. Numerous other characteristics may be used to create a biasing factor and the techniques of this disclosure are not intended to be limited to those described above.

In another example, the biasing factor may be configured by an operator. For example, an operator may manually configure the node in the CO to have a biasing factor that weights the node in the CO more heavily in the selection process than other nodes in the case of a misconfigured ring.

Figure 3:
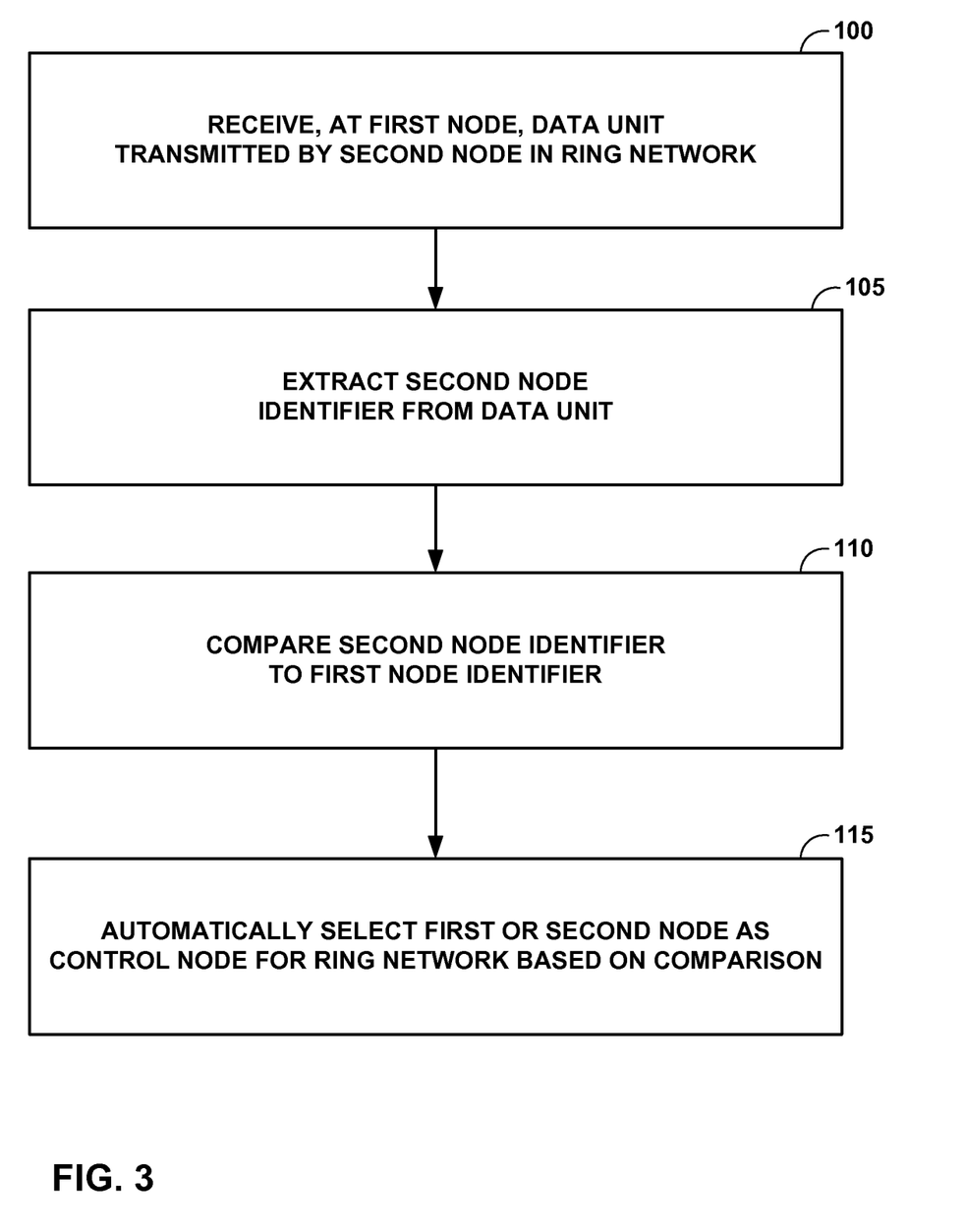
FIG. 3 is a flow diagram illustrating an example method of automatically selecting a control node in a ring network using the techniques described in this disclosure.

FIG. 3 is a flow diagram illustrating an example method of automatically selecting a control node in a ring network using the techniques described in this disclosure. In example method depicted in FIG. 3, a first node, e.g., transport node 12B, of ring network 10 receives a data unit, e.g., a "HELLO" message, transmitted by a second node, e.g., transport node 12A (100). The data unit comprises an identifier that identifies the second node, e.g., a MAC address, character string, or numerical value. In one example, the data unit is transmitted periodically over a control channel of ring network 10. In some examples, the first node stores each of the received identifiers in a memory device, e.g., in table of unique identifiers 46 in memory 48. The received identifiers define the nodes in ring network 10, enabling each transport node to create a complete view of the transport nodes on the ring. The first node and, in particular, processor 42, extracts the unique identifier, e.g., MAC address, of the second node from the data unit (105). The first node, and in particular processor 42, compares the unique identifier of the second node to the identifier of the first node, also unique to ring network 10, e.g., MAC address (110). In some examples, the comparison is invoked in response to the first node receiving a data unit transmitted by the first node or the second node receiving a data unit transmitted by the second node. That is, the comparison is invoked when a node receives its own "HELLO" message. Then, without manual intervention, one of the first node and the second node is automatically selected to act as a control node for ring network 10 based on the comparison (115). For example, between the first node and the second node, the node with the lowest MAC address may be selected to act as a control node.

In one example, the first node, e.g., transport node 12B, receives a plurality of data units from a plurality of transport nodes 12 on ring network 10. Each data unit comprises an identifier unique to the ring network. In another example, the first node stores each identifier received in a memory device.

In some examples, the data unit may include a biasing factor, e.g., aggregate bandwidth of a node, or hardware profile characteristics. Processor 42 of transport node 12B, for example, may apply the biasing factor to the identifier of at least one of the first node and the second node in order to weight the first node or the second node more heavily in the selection of the control node. For example, transport node 12B may be located in the central office, and as such, have greater uplink switch capacity then other nodes on ring network 10. From a network deployment standpoint, it may be desirable to weight such a node more heavily in the selection of the control node. In one example, the bandwidth of the nodes may be used either directly or indirectly to create a biasing factor. Thus, between nodes with differing bandwidth capabilities, the nodes with higher bandwidth are assigned a biasing factor accordingly such that those nodes are weighted more heavily in the selection process.

In another example, processor 42 may generate the biasing factors for the nodes based on one or more criteria associated with the nodes, and apply the respective biasing factors to adjust values of the identifiers of the nodes. When comparing the identifier of the second node to an identifier that identifies the first node, processor 42 compares the adjusted identifier values.

Figure 4:
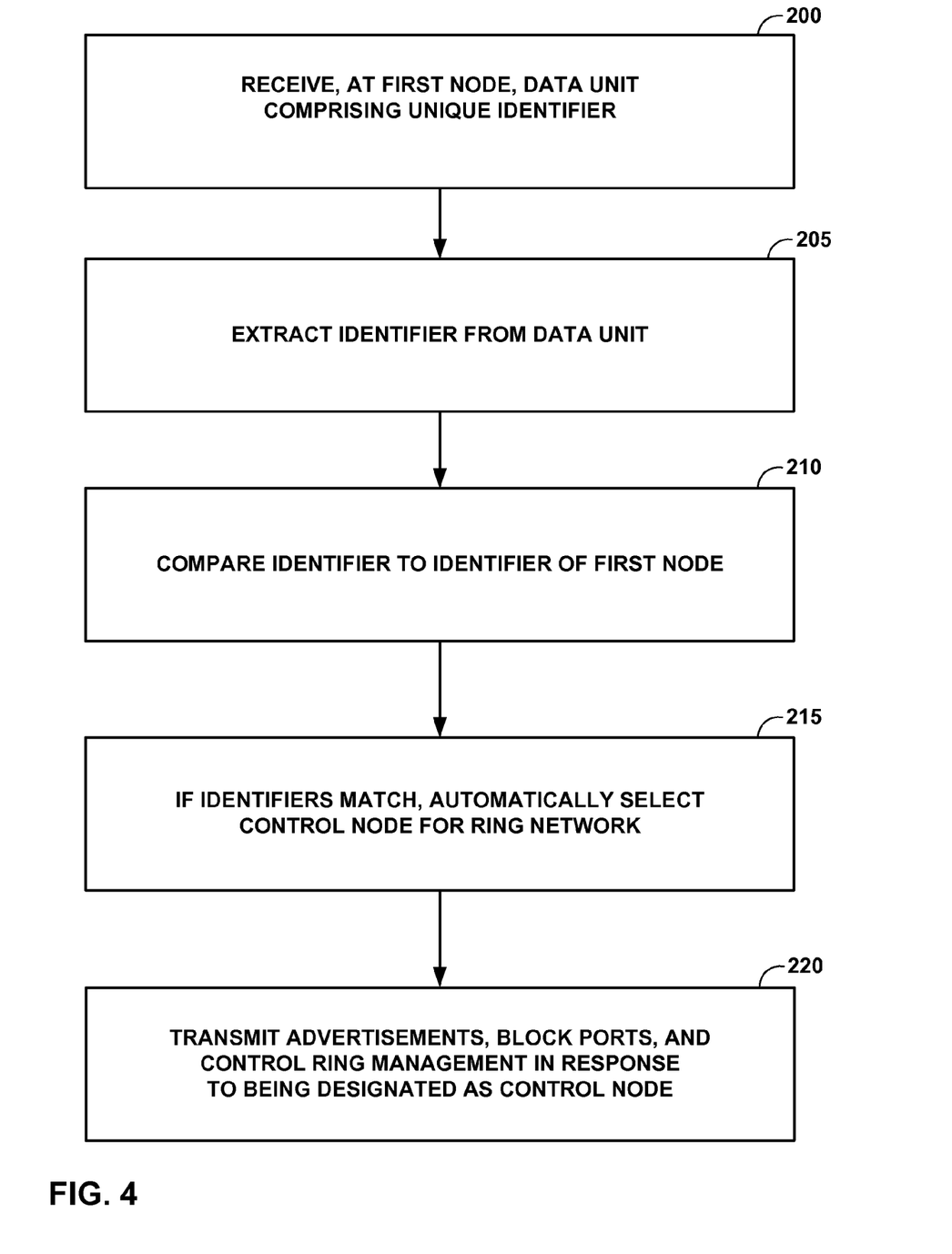
FIG. 4 is a flow diagram illustrating an example method of detecting that a control node in a ring network is missing or not functioning properly using the techniques described in this disclosure.

FIG. 4 is a flow diagram illustrating an example method of detecting that a control node in a ring network is missing or not functioning properly using the techniques described in this disclosure. In the example method depicted in FIG. 4, a first node, e.g., transport node 12B, of ring network 10 receives a data unit, e.g., a "HELLO" message, comprising a unique identifier of a node on the ring network (200). Processor 42 of control unit 40 extracts the unique identifier from the data unit (205). Then, processor 42 compares the unique identifier received to its own unique identifier, e.g., the unique identifier stored in memory 44 as unique identifier 48 (210). If the identifiers match, then the first node has received its own "HELLO" message, indicating that no control node is present, and the transport nodes 12 on the ring network 10 automatically select a transport node to act as a control node (215). Once selected, the control node may begin to transmit advertisements to all the other nodes on the ring indicating that it is the control node, blocks its ports to prevent traffic loops and relay control messages, and control ring management generally.

Figure 5:
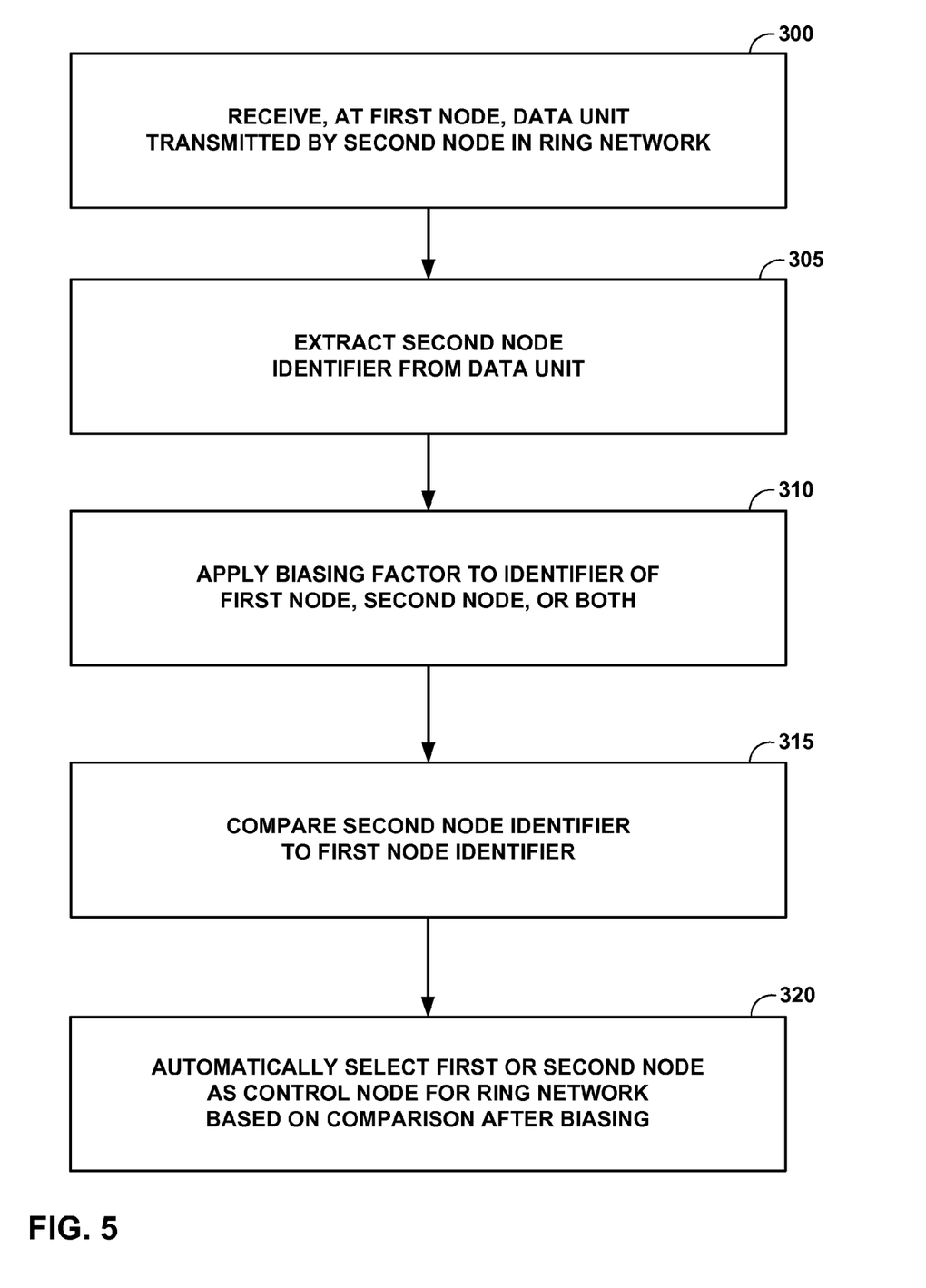
FIG. 5 is a flow diagram illustrating another example method of automatically selecting a control node in a ring network using the techniques described in this disclosure.

FIG. 5 is a flow diagram illustrating another example method of automatically selecting a control node in a ring network using the techniques described in this disclosure. Steps 300-305 in FIG. 5 correspond substantially to steps 100-105 in FIG. 3 and will not be described again. At step 310 in FIG. 5, processor 42 of control unit 40 applies a biasing factor, e.g., aggregate bandwidth or hardware profile characteristic, to the identifier of the first transport node, e.g., transport node 12B, the second transport node, e.g., transport node 12A, or both. After applying the biasing factor, processor 42 compares the identifiers (315) and automatically selects the first or second transport node as the control node for ring network 10 based on the comparison after biasing (320)

The techniques described in this disclosure may be implemented, at least in part, in hardware, software, firmware or any combination thereof. For example, various aspects of the described techniques may be implemented within one or more processors, including one or more microprocessors, digital signal processors (DSPs), network processors (NPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate computing hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples of the disclosure have been described. These and other examples are within the scope of the following claims.

The invention claimed is:

1. A method comprising:
   detecting, at a first node in a ring network, that the ring network does not include a control node that blocks a data path of the ring network to prevent a traffic loop;
   receiving, at the first node in the ring network, a data unit transmitted by a second node in the ring network, the data unit including an identifier that identifies the second node;
   responsive to detecting that the ring network does not include the control node, comparing, at the first node, the identifier of the second node to an identifier that identifies the first node; and
   automatically selecting, at the first node in the ring network, one of the first node and the second node as the control node for the ring network based on the comparison.

2. The method of claim 1, wherein the identifier of the first node and the identifier of the second node are selected from the group consisting of a media access control address, a character string, and a numerical value for the respective nodes.

3. The method of claim 1, wherein receiving the data unit comprises:
   receiving, at the first node in the ring network, a plurality of data units, each data unit comprising an identifier unique to a corresponding node in the ring network.

4. The method of claim 3, further comprising:
   storing each of the received identifiers in a memory device, wherein each respective received identifier defines the corresponding node in the ring network.

5. The method of claim 1, wherein the received data unit is transmitted periodically over a control channel of the ring network.

6. The method of claim 1, further comprising invoking the comparison in response to the first node receiving a data unit transmitted by the first node or the second node receiving a data unit transmitted by the second node.

7. The method of claim 1, further comprising:
   applying a biasing factor to at least one of the first node and the second node, wherein the biasing factor weights one of the first node and the second node more heavily in the selection of the control node.

8. The method of claim 7, wherein the biasing factor is selected from the group consisting of aggregate bandwidth of a respective node, hardware profile characteristics of the respective node, a software version of a respective node, a hardware version of the respective node, a Global Positioning System coordinate of the respective node, upstream network adjacency of the respective node, and a user defined weighting value.

9. The method of claim 1, further comprising:
generating biasing factors for each of the first node and the second node based on one or more criteria associated with each of the first node and the second node;
applying the respective biasing factors to adjust respective values of each of the identifier of the first node and the identifier of the second node,
wherein comparing the identifier of the second node to an identifier that identifies the first node comprises comparing the respective adjusted identifier values.

10. The method of claim 1, wherein detecting that the ring network does not include the control node further comprises:
transmitting, by the first node and from a first port of the first node, a HELLO message over the ring network;
receiving, by the first node and at a second port of the first node, the HELLO message transmitted by the first node over the ring network; and
responsive to receiving the HELLO message transmitted by the first node, determining that the plurality of nodes does not include a control node.

11. The method of claim 10, further comprising:
generating, by the first node, the HELLO message such that the HELLO message includes the identifier that identifies the first node.

12. A network device comprising a processor configured to:
detect, at a first node in a ring network, that the ring network does not include a control node that blocks a data path of the ring network to prevent a traffic loop;
receive, at the first node in the ring network, a data unit transmitted by a second node in the ring network, the data unit including an identifier that identifies the second node;
responsive to the detection that the ring network does not include the control node, compare, at the first node in the ring network, the identifier of the second node to an identifier that identifies the first node; and
automatically select, at the first node in the ring network, one of the first node and the second node as the control node for the ring network based on the comparison.

13. The network device of claim 12, wherein the identifier of the first node and the identifier of the second node are selected from the group consisting of a media access control address, a character string, and a numerical value for the respective nodes.

14. The network device of claim 12, wherein the processor configured to receive the data unit is further configured to:
receive a plurality of data units, each data unit comprising an identifier unique to a corresponding node in the ring network.

15. The network device of claim 14, wherein the processor is further configured to:
store each of the received identifiers in a memory device, wherein each respective received identifier defines the corresponding node in the ring network.

16. The network device of claim 12, wherein the data unit received at the first node is transmitted periodically over a control channel of the ring network.

17. The network device of claim 12, wherein the processor is further configured to:
invoke the comparison in response to the first node receiving a data unit transmitted by the first node or the second node receiving a data unit transmitted by the second node.

18. The network device of claim 12, wherein the processor is further configured to:
apply a biasing factor to at least one of the first node and the second node, wherein the biasing factor weights one of the first node and the second node more heavily in the selection of the control node.

19. The network device of claim 18, wherein the biasing factor is selected from the group consisting of aggregate bandwidth of a respective node, hardware profile characteristics of the respective node, a software version of the respective node, a hardware version of the respective node, a Global Positioning System coordinate of the respective node, upstream network adjacency of the respective node, and a user defined weighting value.

20. The network device of claim 12, wherein the processor is further configured to:
generate biasing factors for each of the first node and the second node based on one or more criteria associated with each of the first node and the second node;
apply the respective biasing factors to adjust respective values of each of the identifier of the first node and the identifier of the second node,
wherein comparing the identifier of the second node to the identifier that identifies the first node comprises comparing the respective adjusted identifier values.

21. The network device of claim 12, wherein the processor configured to detect that the ring network does not include the control node is further configured to:
transmit, from a first port of the first node, a HELLO message over the ring network;
receive, at a second port of the first node, the HELLO message transmitted by the first node over the ring network; and
responsive to receiving the HELLO message transmitted by the first node, determine that the ring network does not include the control node.

22. The network device of claim 21, wherein the processor is further configured to:
generate the HELLO message such that the HELLO message includes the identifier that identifies the first node.

23. A non-transitory computer-readable medium comprising instructions encoded on the computer-readable medium that, upon execution, cause a processor within a network device to:
detect, at a first node of a ring network that the ring network does not include a control node that blocks a data path of the ring network to prevent a traffic loop;
receive, at the first node of the ring network, a data unit transmitted by a second node in the ring network, the data unit including an identifier that identifies the second node;
responsive to the detection that the ring network does not include the control node, compare the identifier of the second node to an identifier that identifies the first node; and
automatically select one of the first node and the second node as the control node for the ring network based on the comparison.

24. The non-transitory computer-readable medium of claim 23, wherein the identifier of the first node and the identifier of the second node are selected from the group consisting of a media access control address, a character string, and a numerical value for the respective nodes.

25. The non-transitory computer-readable medium of claim 23, wherein the instruction to cause the processor to receive the data unit comprises the instruction to:
receive a plurality of data units, each data unit comprising an identifier unique to a corresponding node in the ring network.

26. The non-transitory computer-readable medium of claim 25, further comprising instructions to cause the processor to:
store each of the received identifiers in a memory device, wherein each respective received identifier defines the corresponding node in the ring network.

27. The non-transitory computer-readable medium of claim 23, wherein the received data unit is transmitted periodically over a control channel of the ring network.

28. The non-transitory computer-readable medium of claim 23, further comprising instructions that cause the processor to:
invoke the comparison in response to the first node receiving a data unit transmitted by the first node or the second node receiving a data unit transmitted by the second node.

29. The non-transitory computer-readable medium of claim 23, further comprising instructions that cause the processor to:
apply a biasing factor to at least one of the first node and the second node, wherein the biasing factor weights one of the first node and the second node more heavily in the selection of the control node.

30. The non-transitory computer-readable medium of claim 29, wherein the biasing factor is selected from the group consisting of aggregate bandwidth of a respective node, hardware profile characteristics of the respective node, a software version of the respective node, a hardware version of the respective node, a Global Positioning System coordinate of the respective node, upstream network adjacency of the respective node, and a user defined weighting value.

31. The non-transitory computer-readable medium of claim 23, further comprising instructions that cause the processor to:
generate biasing factors for each of the first node and the second node based on one or more criteria associated with each of the first node and the second node;
apply the respective biasing factors to adjust respective values of each of the identifier of the first node and the identifier of the second node,
wherein comparing the identifier of the second node to an identifier that identifies the first node comprises comparing the respective adjusted identifier values.

32. A network device comprising:
means for detecting, a first node in a ring network, that the ring network does not include a control node that blocks a data path of the ring network to prevent a traffic loop;
means for receiving, at the first node in the ring network, a data unit transmitted by a second node in the ring network, the data unit including an identifier that identifies the second node;
means for comparing, responsive to detecting that the ring network does not include the control node, the identifier of the second node to an identifier that identifies the first node; and
means for automatically selecting one of the first node and the second node as a control node for the ring network based on the comparison.

33. The network device of claim 32, wherein the identifier of the first node and the identifier of the second node are selected from the group consisting of a media access control address, a character string, and a numerical value for the respective nodes.

34. The network device of claim 32, wherein the means for receiving the data unit comprises:
means for receiving a plurality of data units, each data unit comprising an identifier unique to a corresponding node in the ring network.

35. The network device of claim 34, further comprising:
means for storing each of the received identifiers in a memory device, wherein each respective received identifier defines the corresponding node in the ring network.

36. The network device of claim 32, wherein the received data unit is transmitted periodically over a control channel of the ring network.

37. The network device of claim 32, further comprising means for invoking the comparison in response to the first node receiving a data unit transmitted by the first node or the second node receiving a data unit transmitted by the second node.

38. The network device of claim 32, further comprising:
means for applying a biasing factor to at least one of the first node and the second node, wherein the biasing factor weights one of the first node and the second node more heavily in the selection of the control node.

39. The network device of claim 38, wherein the biasing factor is selected from the group consisting of aggregate bandwidth of the node, hardware profile characteristics of the node, a software version of the node, a hardware version of the node, a Global Positioning System coordinate of the node, upstream network adjacency of the node, and a user defined weighting value.

40. The network device of claim 32, further comprising:
means for generating biasing factors for each of the first node and the second node based on one or more criteria associated with each of the first node and the second node;
means for applying the respective biasing factors to adjust respective values of each of the identifier of the first node and the identifier of the second node,
wherein the means for comparing the identifier of the second node to an identifier that identifies the first node comprises means for comparing the respective adjusted identifier values.

41. A system comprising:
a ring network comprising a first node and a second node, wherein the first node of the ring network comprises:
an interface module comprising at least one port that receives a data unit transmitted by the second node, the data unit including an identifier that identifies the second node; and
a first control unit configured to:
detect that the ring network does not include a control node that blocks a data path of the ring network to prevent a traffic loop;
responsive to detecting that the ring network does not include the control node, compare the identifier of the second node to an identifier that identifies the first node; and
automatically select one of the first node and the second node as the control node for the ring network based on the comparison.

42. The system of claim 41, wherein the identifier of the first node and the identifier of the second node are selected from the group consisting of a media access control address, a character string, and a numerical value for the respective nodes.

43. The system of claim 41, further comprising:
a memory that stores each of the received identifiers, wherein each respective received identifier defines a corresponding node in the ring network.

44. The system of claim 41, wherein the ring network further comprises a control channel, and wherein the received data unit is transmitted periodically over the control channel.

45. The system of claim 41, wherein the control unit is further configured to:
  invoke the comparison in response to the first node receiving a data unit transmitted by the first node or the second node receiving a data unit transmitted by the second node.

46. The system of claim 41, wherein the control unit is further configured to:
  apply a biasing factor to at least one of the first node and the second node, wherein the biasing factor weights one of the first node and the second node more heavily in the selection of the control node.

47. The system of claim 46, wherein the biasing factor is selected from the group consisting of aggregate bandwidth of the node, hardware profile characteristics of the node, a software version of the node, a hardware version of the node, a Global Positioning System coordinate of the node, upstream network adjacency of the node, and a user defined weighting value.

48. The system of claim 41, wherein the processor is further configured to:
  generate biasing factors for the first node and the second node based on one or more criteria associated with the first node and the second node;
  apply the respective biasing factors to adjust respective values of each of the identifier of the first node and the identifier of the second node,
  wherein comparing the identifier of the second node to an identifier that identifies the first node comprises comparing the respective adjusted identifier values.

* * * * *

UNITED STATES PATENT AND TRADEMARK OFFICE
CERTIFICATE OF CORRECTION

PATENT NO. : 8,320,282 B2  
APPLICATION NO. : 12/512223  
DATED : November 27, 2012  
INVENTOR(S) : Michael T. Rollins Page 1 of 1

It is certified that error appears in the above-identified patent and that said Letters Patent is hereby corrected as shown below:

On the Title Page, Item (56), under the heading OTHER PUBLICATIONS:

"Bränl" should read -- Bräunl --

Signed and Sealed this  
Twenty-third Day of December, 2014

Michelle K. Lee  
*Deputy Director of the United States Patent and Trademark Office*